United States Patent
Konishi

(10) Patent No.: US 8,172,442 B2
(45) Date of Patent: May 8, 2012

(54) VEHICLE LAMP

(75) Inventor: Sadayuki Konishi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 772 days.

(21) Appl. No.: 12/023,221

(22) Filed: Jan. 31, 2008

(65) Prior Publication Data

US 2008/0180968 A1    Jul. 31, 2008

(30) Foreign Application Priority Data

Jan. 31, 2007 (JP) .................. 2007-021152

(51) Int. Cl.
*F21S 8/12* (2006.01)
(52) U.S. Cl. ......... 362/538; 362/507; 362/516; 362/518
(58) Field of Classification Search .................. 362/538, 362/507, 516, 518, 296.08, 341
See application file for complete search history.

(56) References Cited

U.S. PATENT DOCUMENTS

| | | | | |
|---|---|---|---|---|
| 3,646,385 A | * | 2/1972 | Wichert | 313/115 |
| 5,278,452 A | * | 1/1994 | Matsumoto et al. | 307/10.8 |
| 5,544,021 A | | 8/1996 | Lopez et al. | |
| 6,439,739 B1 | * | 8/2002 | Sischka | 362/211 |
| 6,644,828 B2 | * | 11/2003 | Kinouchi | 362/214 |
| 2004/0136134 A1 | * | 7/2004 | Okawa et al. | 361/93.1 |
| 2004/0136200 A1 | * | 7/2004 | Bos et al. | 362/512 |
| 2006/0061300 A1 | * | 3/2006 | Biebl et al. | 315/291 |

FOREIGN PATENT DOCUMENTS

| | | | |
|---|---|---|---|
| JP | 59-158002 A | | 9/1984 |
| JP | 05334902 A | * | 12/1993 |
| JP | 6-187806 A | | 7/1994 |
| JP | 07001503 U | | 1/1995 |
| JP | 2001-135109 A | | 5/2001 |

OTHER PUBLICATIONS

Japanese Office Action for Japanese Patent Application No. 2007-021152 dated Feb. 4, 2011.
Chinese Office Action along with in-part English translation thereof for Chinese Patent Application No. A 200810008959.4 dated Jul. 20, 2011.

* cited by examiner

*Primary Examiner* — Sharon Payne
(74) *Attorney, Agent, or Firm* — Kenealy Vaidya LLP

(57) ABSTRACT

A vehicle headlamp can include a daytime running lamp with favorable light distribution characteristics. The vehicle headlamp can also include a headlight such as a low beam/high beam, a fog lamp, and the like. The vehicle headlamp can include a parabolic type reflector, a halogen bulb, and a driving circuit. The halogen bulb can include a first filament, a second filament and a shield member if necessary or desired. The first filament can be used as the above headlight, and the second filament adjacent the first filament can be used as the daytime running lamp. Because the second filament can be located at a closer position than the first filament with respect to the reflector, light emitted from the second filament can form a wider light distribution than that of the first filament. Therefore, the vehicle headlamp can provide a daytime running lamp with a favorable light distribution pattern along with the above headlight.

14 Claims, 12 Drawing Sheets

VEHICLE LAMP

This application claims the priority benefit under 35 U.S.C. §119 of Japanese Patent Application No. 2007-021152 filed on Jan. 31, 2007, which is hereby incorporated in its entirety by reference.

BACKGROUND

1. Field

The presently disclosed subject matter relates to a vehicle lamp including a vehicle headlamp attached to the front of a vehicle such as a car, and more particularly to a vehicle headlamp including a daytime running lamp in a headlight, an auxiliary headlight, spot light, traffic light, and the like.

2. Description of the Related Art

A conventional headlight is usually attached to the front of a vehicle such as a car with the purpose of illuminating the road ahead. The light can be used anytime, but particularly during periods of low visibility like at night or during precipitation. The conventional headlight includes a high beam for illuminating the road far ahead when other vehicles (e.g., oncoming cars) are not in front of the driven vehicle, and includes a low beam for illuminating the road near ahead so as not to generate a glare when vehicles like oncoming cars approach towards the driven vehicle. Therefore, the high beam is directed in a slightly upward-leftward direction and the low beam is directed in a slightly downward-rightward direction.

A conventional auxiliary headlight is used as a vehicle lamp that provides a light distribution similar to the above-described conventional headlight when attached to the front of a vehicle such as a car. The conventional auxiliary headlight includes a fog lamp, a spot lamp and a driving lamp. The fog lamp is used for illuminating the road ahead during periods of low visibility such as when fog is present, the spot lamp is used for providing a high beam light distribution during periods of high-speed driving, and the driving lamp is basically used for compensating for both low beam and fog lamps. Therefore, a light distribution of a fog lamp is broad and directed toward the road, the light distribution of a spot lamp is concentrated far ahead in a direction toward the road, and the light distribution of a driving lamp is somewhere in the middle between a fog lamp and a spot lamp.

The above-described headlight and auxiliary headlight collectively define a vehicle headlamp. The above-described conventional vehicle headlamp is configured with a structure, for instance, as shown by FIG. 9. A vehicle headlamp 1 is a parabolic typed headlight or auxiliary headlight, which includes a bulb 2, a reflector 3 and a driving circuit 4.

The bulb 2 is a conventional bulb that is used for a conventional vehicle headlamp, for example, a halogen bulb. The reflector 3 is configured with a parabolic reflex surface, which has a focus F located near a light-emitting portion of the bulb 2 and a symmetrical axis that extends horizontally toward the light-emitting direction of the vehicle headlamp 1. An inner reflex surface of the reflector 3 includes not only a revolved surface of a parabola but also a free surface that is based on a parabolic surface.

The driving circuit 4 is configured with well-known circuits to supply the bulb 2 with a driving voltage from a battery via a switching circuit and the like. Therefore, when the driving circuit 4 supplies the bulb 2 with the driving voltage, the bulb 2 of the vehicle headlamp 1 emits light and illuminates the road ahead.

According to the vehicle headlamp 1 made by the above-described configuration, one direct portion of the light emitted from the bulb 2 illuminates directly in the light-emitting direction of the vehicle headlamp 1 and another reflected portion of the light illuminates the road indirectly by being reflected from the reflector 3 in the light-emitting direction of the vehicle headlamp 1. The direct portion and reflected portion of light are formed as approximately horizontal parallel beams, respectively, and form a light distribution pattern, for example, for a fog lamp as shown by FIG. 10. In this case, a central maximum luminosity is approximately 5,250 cd when the driving voltage is 12.8 V.

Recently, a daytime lighting (or running lighting) used with respect to a vehicle headlamp such as a headlight and an auxiliary headlight has held public attention in order to improve visibility of a vehicle from the perspective of other vehicles and in view of safe driving considerations. However, daytime lighting of the conventional vehicle headlamp 1 shown in FIG. 9 may cause an overload of a battery. Therefore, recently, vehicles have been provided with an additional vehicle lamp used for a daytime running lamp, which is different from the vehicle headlamp 1 and is a small lamp having small power consumption. However, providing such a daytime running lamp results in a high cost for the vehicular lamps because of the addition of a new vehicle lamp in addition to the conventional vehicle headlamp 1.

Under the circumstances, a method for using a fog lamp of an auxiliary headlight as a daytime running lamp is well-known as shown in FIG. 11. The difference between FIG. 9 and FIG. 11 is an addition of a control circuit 5 located between the bulb 2 and the driving circuit 4 in the vehicle headlamp of FIG. 9. The method allows the light distribution for a daytime running lamp to not generate a glare in a central maximum luminosity by reducing the maximum luminosity, for example, to less than 1,000 cd. The driving voltage can be reduced by supplying, for example, 4V, from the driving circuit 4 via the control circuit 5. Thus, the method may result in forming a light distribution for a daytime running lamp as shown in FIG. 12.

The above-described control circuit 5 is configured with a resistor, PWM circuit and/or the like to reduce a voltage of a battery. Therefore, the control circuit 5 enables a low driving voltage to be supplied to the bulb 2 in order to form a light distribution for a daytime running lamp.

When the bulb 2 is a halogen bulb, a halogen cycle is generated in the bulb 2 during lighting. A halogen cycle is characterized as follows: tungsten evaporates from a filament of the light source; the tungsten combines with a halogen and circulates in the bulb 2; the tungsten near the filament separates from the halogen by heat of the filament; and the evaporated tungsten returns to the filament. The halogen cycle enables a halogen bulb to extend its life. However, a halogen cycle can be generated due to the combining of tungsten with a halogen when a halogen is more than 250 centigrade degrees in general.

As described above, the method for using a fog lamp as a daytime running lamp can involve the reduction of the driving voltage of bulb 2 to, for example, 4V. However, when the control circuit 5 supplies the bulb 2 with such a low voltage, a halogen cycle may not be generated because halogen in the bulb 2 cannot become more than 250 centigrade degrees. Thus, the tungsten adheres to an inner surface of glass of the bulb 2 and the life of the bulb 2 is extremely shortened. In addition, light-emitting luminosity of the bulb 2 decreases because of the tungsten adhered to the inner surface of the glass.

Furthermore, a light-emitting intensity distribution for the light distribution pattern for a daytime running lamp shown in FIG. 12 is basically the same as that for the fog lamp. A central maximum luminosity is higher than other portions, for example, 945 cd when a driving voltage is 4V. Thus, because the light distribution pattern is bright only in a central portion and is very dark around the central portion, visibility of the driven vehicle decreases.

On the other hand, a headlight that provides both a movable upper portion of a reflector and a movable shade is disclosed in patent document No. 1 (Japanese Utility Model Patent Application Laid Open H07-001503). The headlight can move both an upper portion of a reflector and a shade. In the case of high beam mode, the headlight has the shade moved so that the shade does not prevent emission of light rays from a light source and has the upper portion of the reflector moved so that a focus thereof is located near the light source. Thus, because the light source illuminates forwards in the light-emitting direction of the headlight by reflecting at least a portion of the light thereof via both the upper portion of the reflector and the under portion, the headlight can form a light distribution for a high beam.

In the case of low beam mode, the headlight has the shade located in the light path of the light source so that the shade prevents at least a portion if light from the light source from passing towards the upper portion of the reflector. At the same time, the upper portion of the reflector can be located so that the focus thereof is located at a position spaced far from the light source. Thus, because the light source illuminates the road in a forwards-downwards direction and in the light-emitting direction of the headlight by reflecting a light thereof via the under portion of the reflector, the headlight can form a light distribution for a high beam.

As described above, the movements of both the shade and the upper portion of the reflector enable the headlight to form both a high beam and a low beam light distribution pattern. However, patent document No. 1 does not disclose, among other features, the headlight being used as a daytime running lamp. Thus, patent document No. 1 is perfectly different from the disclosed subject matter in purpose, structure, effect and the like.

1. Patent document No. 1: Japanese Utility Model Patent Application Laid Open H07-001503

The disclosed subject matter has been devised to consider the above and other problems and characteristics. Thus, an embodiment of the disclosed subject matter can include a daytime running lamp with a simple structure and a favorable light distribution pattern in a parabolic typed headlight or auxiliary headlight, and the daytime running lamp can be driven by a driving voltage that can generate a halogen cycle in order for the halogen bulb to enjoy a long life.

SUMMARY OF THE DISCLOSED SUBJECT MATTER

The presently disclosed subject matter has been devised in view of the above and other characteristics, desires, and problems in the art, and to make certain changes to the existing vehicle headlamp. An aspect of the disclosed subject matter includes providing a vehicle headlamp including a daytime running lamp with a more favorable light distribution pattern than a conventional daytime running lamp along with a headlight for illuminating the near portion of road ahead, such as a low beam mode headlight, a fog lamp and the like.

Another aspect of the disclosed subject matter includes providing a vehicle headlamp including a daytime running lamp with a more favorable light distribution pattern than a conventional daytime running lamp along with a headlight for illuminating the road far ahead, such as a high beam headlight and the like.

According to another aspect of the disclosed subject matter, a vehicle headlamp including a daytime running lamp can include: a reflector being of parabolic type with a symmetrical axis; a halogen bulb that includes a first filament, a second filament and a shield member and located on the substantially symmetrical axis of the reflector, the first filament thereof located near a focus of the reflector, the second filament located adjacent the first filament, and the shield member located adjacent the first filament so as to shut out a light emitted from the first filament downwards; and a driving circuit supplying both the first filament and the second filament with a respective driving voltage for light-emission, wherein the light emitted from the second filament can be used as the daytime running lamp.

In the above-described exemplary vehicle headlamp, the driving circuit can be configured to generate a halogen cycle in the halogen bulb. An underneath area of the reflector can also be configured to extend the light emitted from the second filament in both directions, left and right, towards the symmetrical axis. In addition, a light emitted from the first filament can also be used as a fog lamp, a driving lamp, and/or a low beam for a headlight.

According to another aspect of the disclosed subject matter, a vehicle headlamp including a daytime running lamp can include: a reflector being of a parabolic type with a substantially symmetrical axis; a halogen bulb that includes a first filament and a second filament and located on the substantially symmetrical axis of the reflector, the first filament thereof located at a focus of the reflector or at a closer position relative to the reflector than the focus of the reflector, the second filament located at a closer position relative to the reflector than the first filament; and a driving circuit supplying both the first filament and the second filament with a respective driving voltage for light-emission, wherein the light emitted from the second filament can be used as the daytime running lamp.

In the immediately above-described exemplary vehicle headlamp, the driving circuit can be configured to generate a halogen cycle in the halogen bulb. An area underneath the reflector can be also configured to extend the light emitted from the second filament in both directions left and right, towards the symmetrical axis. In addition, light emitted from the first filament can also be used as one of a spot lamp and a high beam for a headlight.

According to the above-described exemplary vehicle headlamp, the daytime running lamp can form a favorable light distribution pattern so that the central luminosity can be slightly reduced and the under luminosity can expand in both directions, left and right, towards the symmetrical axis. Thus, the disclosed subject matter can provide a vehicle headlamp including a daytime running lamp with a favorable light distribution pattern along with the above headlight.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
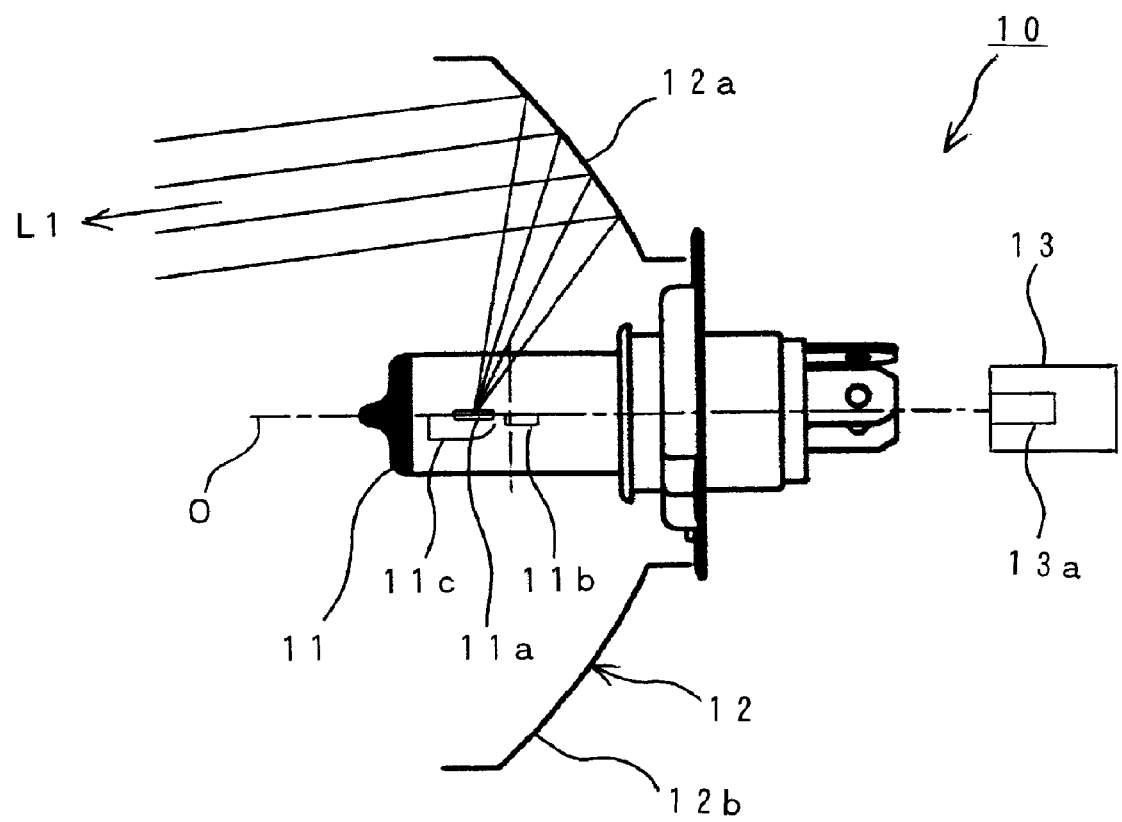
FIG. 1 is a schematic side cross-section view showing a structure for an exemplary embodiment of a vehicle headlamp made in accordance with principles of the disclosed subject matter.

The disclosed subject matter will now be described in detail with reference to FIGS. 1 to 8. FIG. 1 is a schematic side cross-section view showing a structure for an exemplary embodiment of a vehicle headlamp made in accordance with principles of the disclosed subject matter. A vehicle headlamp 10 as shown in FIG. 1 can include a parabolic type headlamp for use as a fog lamp, which can include a bulb 11 used as a light source, a reflector 12 and a driving circuit 13.

The bulb 11 can be a double filament type bulb, which is generally used as a light source for various vehicle headlamps as described above. For example, the bulb 11 can be an H4 type halogen bulb or can be other well known bulb configurations. The bulb 11 can be attached to the reflector 12 via a socket so that a light axis O thereof corresponds with a direction towards light-emission for the vehicle headlamp 10. The bulb 11 can include a first filament 11a therein and a second filament 11b adjacent the first filament 11a. The first filament 11a and the second filament 11b can be selectively emitted, respectively.

In addition, the bulb 11 can include a shield member 11c adjacent the first filament 11a. The shield member 11c can be configured with a shield material to shut out a downward light emitted from the first filament.

The reflector 12 can be formed in a concave shape in the direction towards light-emission for the vehicle headlamp 10 so that a light emitted from the bulb 11 can reflect in the direction towards the light-emission. A focus of the reflector 12 can be located near the first filament 11a of the bulb 11. The reflector 12 can be configured with a parabolic reflex reflector so that a symmetrical axis thereof corresponds with the light axis O of the bulb 11 which extends in the direction towards the light-emission for the vehicle headlamp 10. The reflex reflector is not limited a parabolic surface and/or an elliptical surface, and can include a free surface based on a parabolic surface or plurality of surfaces.

Figure 2:
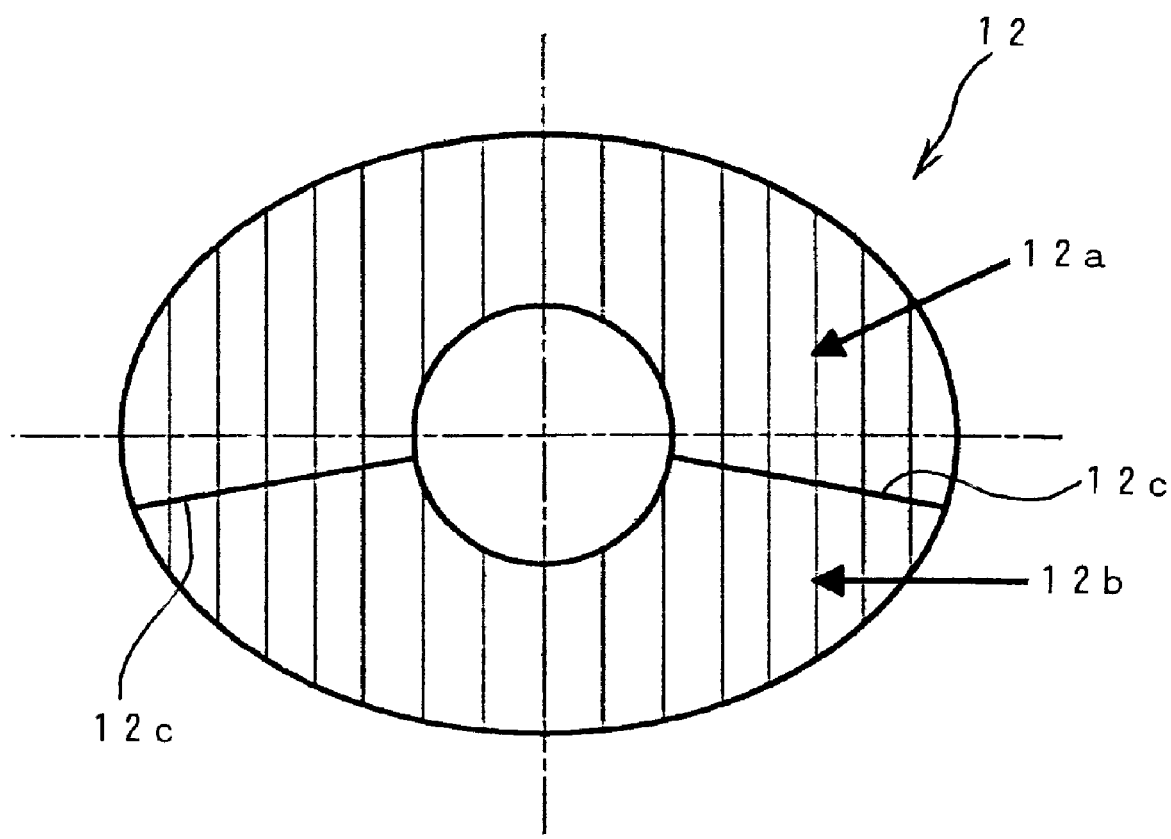
FIG. 2 is a schematic front view showing a structure of a reflector in the vehicle headlamp shown in FIG. 1.

Furthermore, the reflector 12 can include an upper area 12a and an under area 12b therein as shown in FIG. 2. In this case, a boundary line 12c between the upper area 12a and the under area 12b can be formed to extend obliquely downwards with a respective predetermined angle in both directions, left and right, in a front view.

The focus of the upper area 12a can be located near the first filament 11a of the bulb 11. Thus, the upper area 12a can form the same light distribution pattern as that of a normal fog lamp by reflecting light emitted from the first filament 11a. The light distribution pattern of a fog lamp can be wide with a cut-off line. However, when the upper area 12a reflects light emitted from the second filament 11b, the light distribution pattern can be broader than the case of the first filament 11a. The second filament 11b can be located at a position closer to the reflector 12 than the above-described focus of the reflector 12a.

The under area 12b can be configured to form a wider light distribution pattern than the upper area 12a. Thus, when the under area 12b receives light emitted from the second filament 11b, the under area 12b can form a wider light distribution pattern than that of the upper area 12a. However, the under area 12b cannot receive light emitted from the first filament 11a of the bulb 11 because light emitted from the first filament 11a towards the under area 12b can be shut out by the shield member 11c.

The driving circuit 13 can supply current to both the first filament 11a of the bulb 11 and the second filament 11b via a switching circuit, which can change a supplier of driving voltage. In addition, the driving circuit 13 can include a controller 13a that can adjust a preferable driving voltage from a battery voltage via a resistor, PWM controller and the like. Thus, the driving circuit 13 can supply the second filament 11b of the bulb 11 with a desired driving voltage (e.g. 6.4V in one application) in order to illuminate in a daytime running lamp mode. A possible driving voltage is, for example, approximately 6.4V when using H4 bulb as a light source.

The vehicle headlamp 10 in accordance with an exemplary embodiment of the disclosed subject matter can be configured as described above. That is, the bulb 11 can be operated to cause light to be emitted from the first filament 11a and light to be emitted from the second filament 11b by supplying the bulb 11 with a respective driving voltage. The light emitted from the bulb 11 can illuminate the road ahead in the light-emission direction by reflecting on the reflector 12.

Figure 3A:
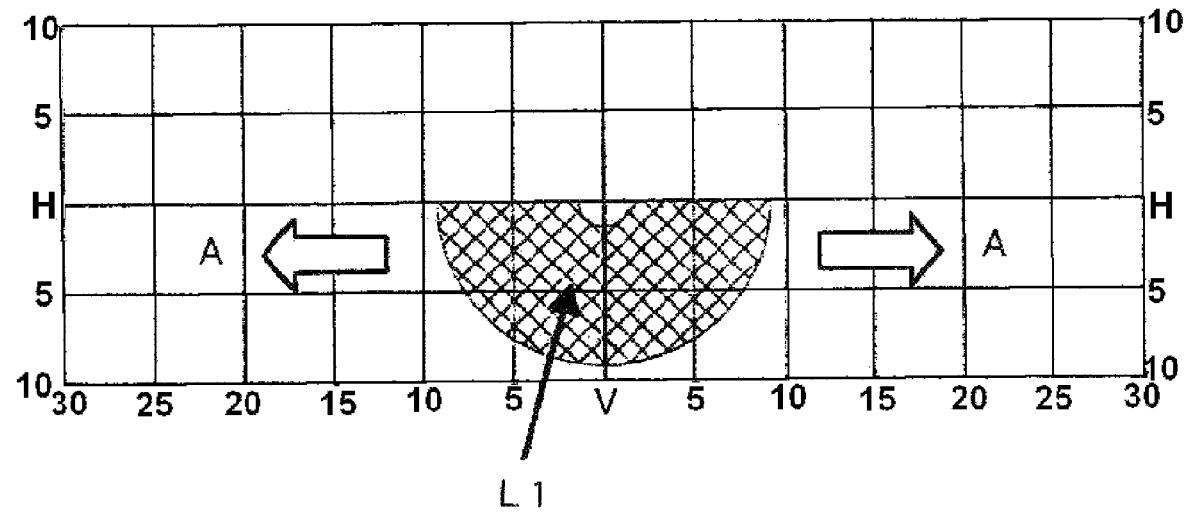
FIG. 3(A) is a graph showing a light distribution for a fog lamp made in accordance with the vehicle headlamp shown in FIG. 1.

When the vehicle headlamp 10 is used as a fog lamp, the driving circuit 13 can supply the first filament 11a of the bulb 11 with a normal voltage, for example, 12.8V so that the first filament 11a emits light. In that case, the light L1 emitted from the first filament 11a can reach to the upper area 12a of the reflector 12. However, the light L1 cannot reach to the under area 12b of the reflector 12 because of the shield member 12c. Thus, the light distribution of the vehicle headlamp 10 can form a spot pattern that can project in a downward direction with respect to the light axis O as shown in FIG. 3(A). The light distribution can extend in both directions, left and right, as shown by arrow A in accordance with a shape of the upper area 12a.

Because the first filament 11a is located near a focus of the reflector 12, light reflected from the upper area 12a can project in a direction towards the light-emission of the vehicle headlamp 10 with an approximately parallel beam. In this case, because the reflected light L1 can form a wide light distribution pattern with a cut-off line in accordance with the upper area 12a of the reflector 12, the spot pattern formed by the upper area 12a can extend in both directions, left and right, as shown in FIG. 3(A). Thus, the light distribution pattern for a fog lamp can result in providing high visibility for a long distance due to a high central luminosity thereof and favorable luminosity for a high beam, for example, approximately 54,000 cd.

Figure 5:
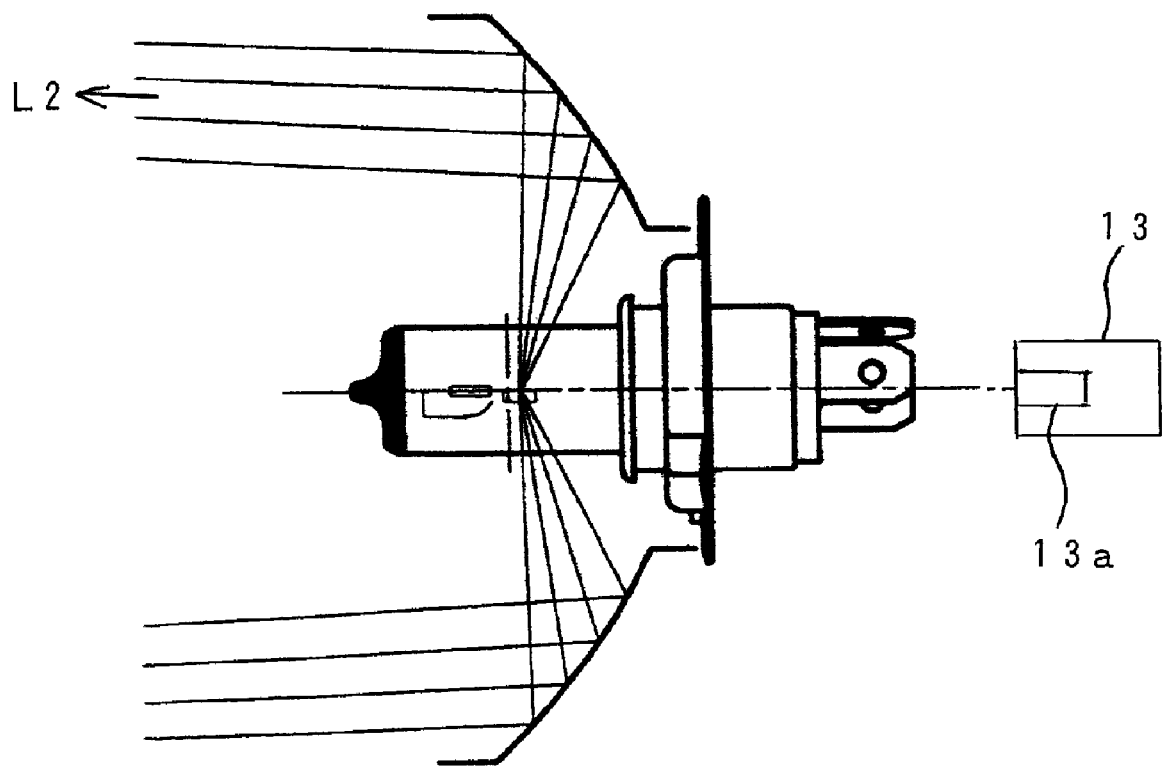
FIG. 5 is a schematic side cross-section showing operation of a daytime running lamp in accordance with the vehicle headlamp shown in FIG. 1.

On the other hand, when the vehicle headlamp 10 is used as a daytime running lamp, the driving circuit 13 can supply the second filament 11b of the bulb 11 with a low voltage, for instance, approximately 6.4V in the case when an H4 bulb is used. In this case, the second filament 11b of the bulb 11 can emit light as shown in FIG. 5. Thus, light L2 that is emitted from the second filament 11b can reach both the upper area 12a of the reflector 12 and the under area 12b.

Figure 3B:
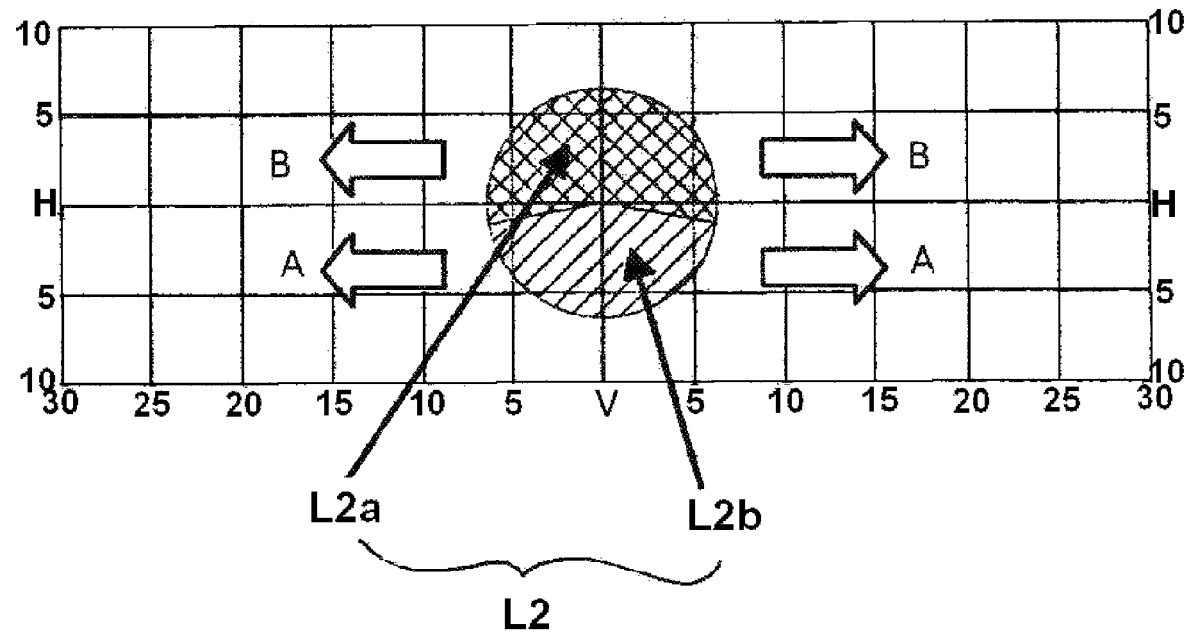
FIG. 3(B) is a graph showing a light distribution for a daytime running lamp made in accordance with the vehicle headlamp shown in FIG. 1.
Figure 4:
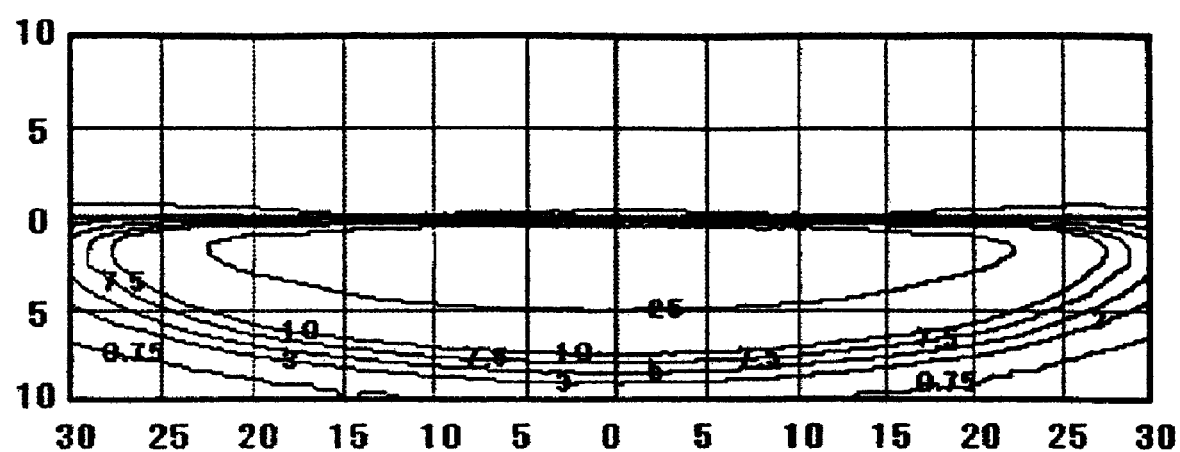
FIG. 4 is a diagram showing a light distribution pattern of a fog lamp projected by the vehicle headlamp shown in FIG. 1.

The light distribution of light L2 of the vehicle headlamp 10 can be projected as shown in FIG. 3(B). That is to say, the light distribution L2 can include a spot pattern L2a in a direction upwards with respect to the light axis via the upper area 12a of the reflector 12 and can include a spot pattern L2b in a direction downwards with respect to the light axis via the under area 12b of the reflector 12. In addition, the spot pattern L2a can extend in both directions, left and right, in accordance with a shape of the upper area 12a, and the spot pattern L2b can also extend in both directions, left and right, in accordance with a shape of the under area 12b.

In this case, the second filament 11b of the bulb 11 can be located at a predetermined backward position from the focus of the reflector 12 (position closer to the reflector 12 than the focus). Thus, because the light distribution L2 reflected from the reflector 12 can be projected forwards in an indistinct state, the light distribution L2 can be broader than that of the light distribution L1.

Figure 6:
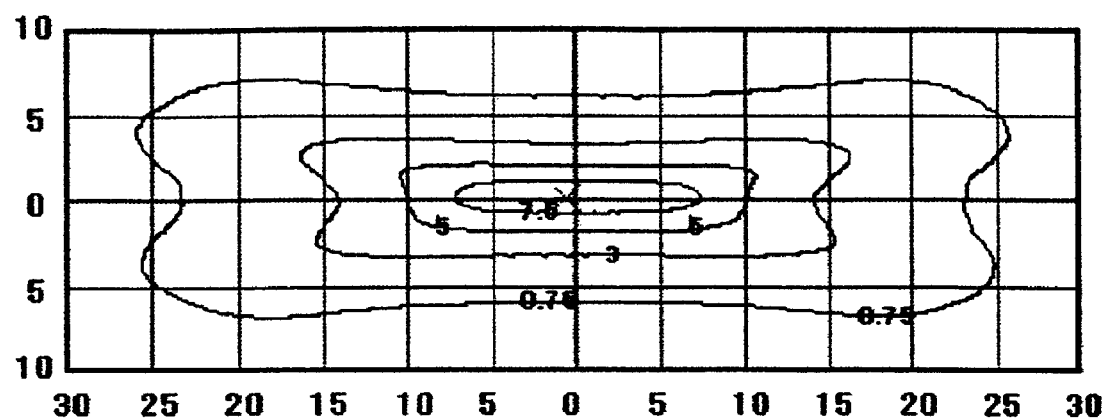
FIG. 6 is a diagram showing a light distribution pattern of a daytime running lamp projected by the vehicle headlamp shown in FIG. 1.

FIG. 6 depicts the above-described light distribution pattern for a daytime running lamp projected by the vehicle headlamp 10 of FIG. 1. A central luminosity of the light distribution may not be so high, and can be a favorable value for use as a daytime running lamp, for example, approximately 900 cd. In addition, because the light distribution pattern can be broad and in an indistinct state, a peripheral luminosity can be maintained at a certain amount. Thus, because the light distribution pattern can include a favorable luminosity in a broad area as a daytime running lamp, the daytime running lamp in accordance with the disclosed subject matter can result in a high visibility for the vehicle.

Furthermore, because the daytime running lamp can include structure that causes a central luminosity that is not so high, the driving voltage of the lamp supplied to the second filament 11b can be higher than that of a conventional daytime running lamp. Thus, an inner temperature of the bulb 11 can be maintained at more than 250 centigrade degrees, and a halogen cycle can thus be generated. The driving voltage of the bulb 11 can be low, e.g. 6.4V, when using an H4 bulb as a light source. Consequently, a part of the tungsten of the filament material is prevented from adhering to an inner surface of glass of the bulb 11, and the life of the bulb 11 is not reduced. Thus, light-emitting luminosity of the bulb 11 is not decreased due to tungsten adhering to the inner surface of the glass bulb.

Figure 7:
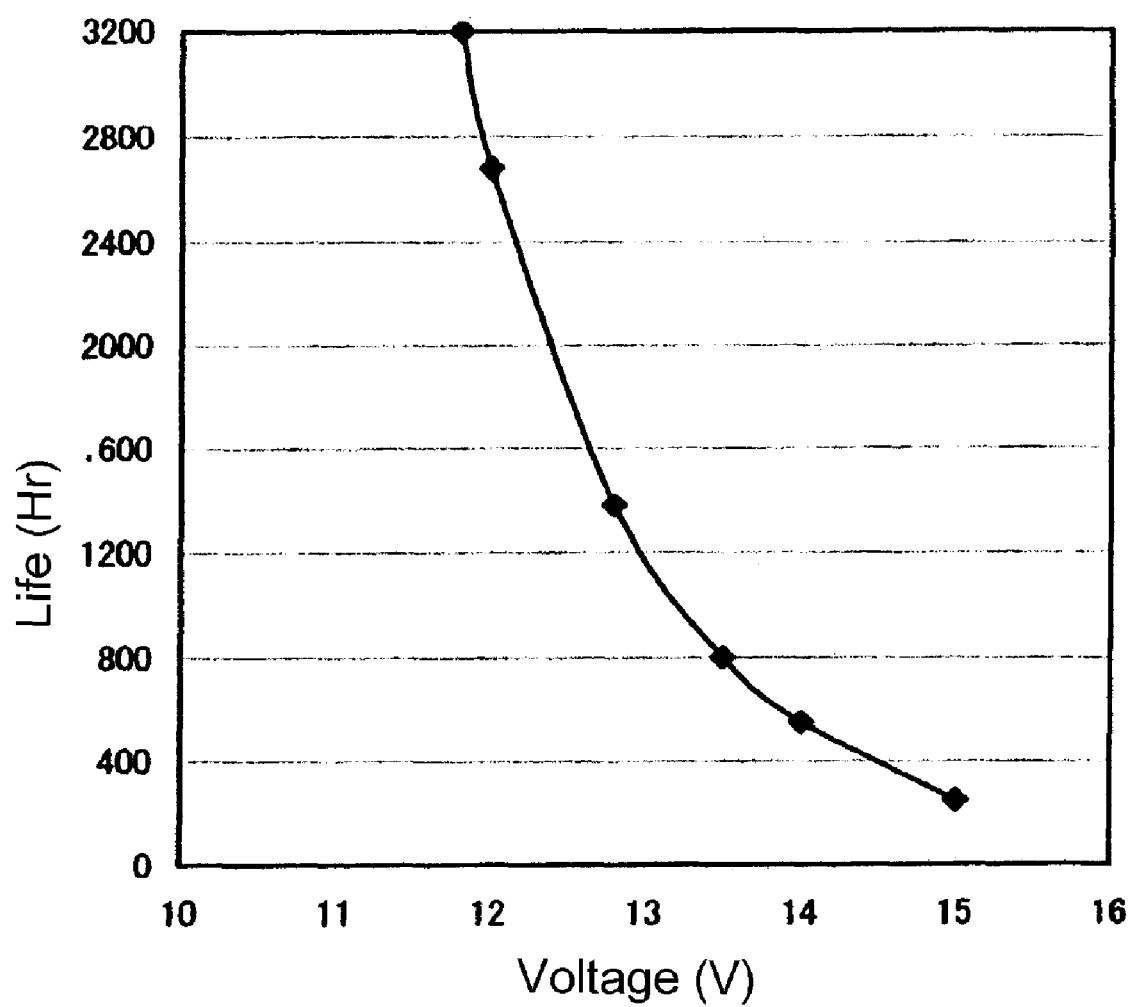
FIG. 7 is a graph showing a life of a halogen bulb as compared to a voltage of a battery.
Figure 8:
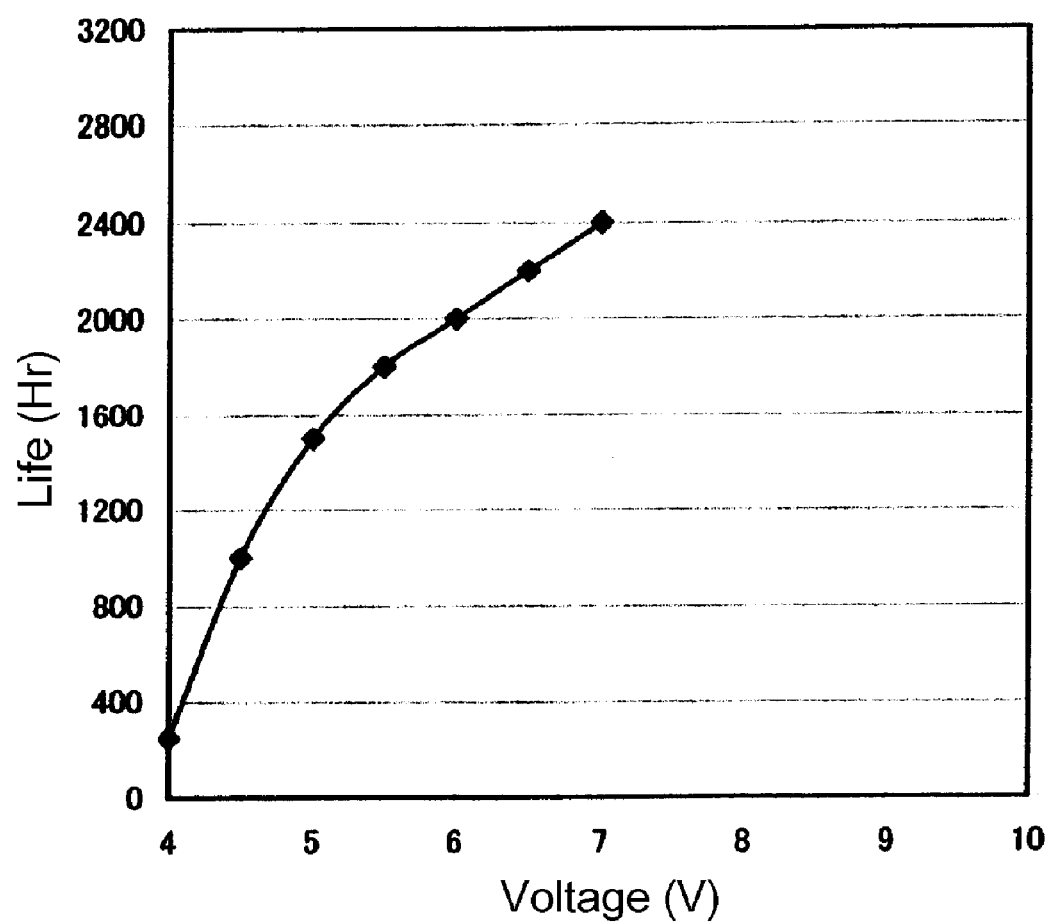
FIG. 8 is a graph showing a life of a halogen bulb as compared to a low driving voltage.
Figure 9:
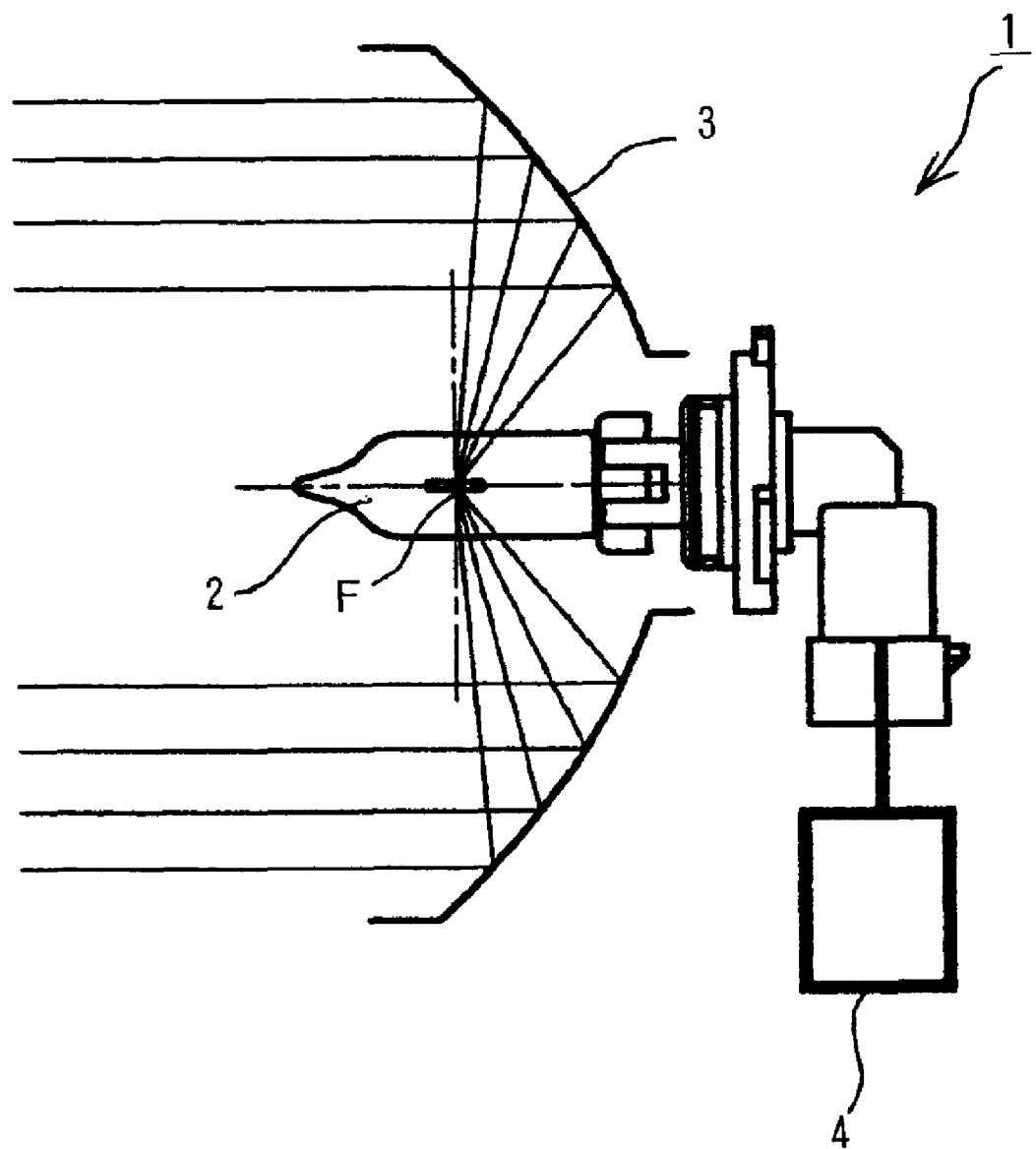
FIG. 9 is a schematic side cross-section view showing an exemplary structure of a conventional vehicle headlamp.
Figure 10:
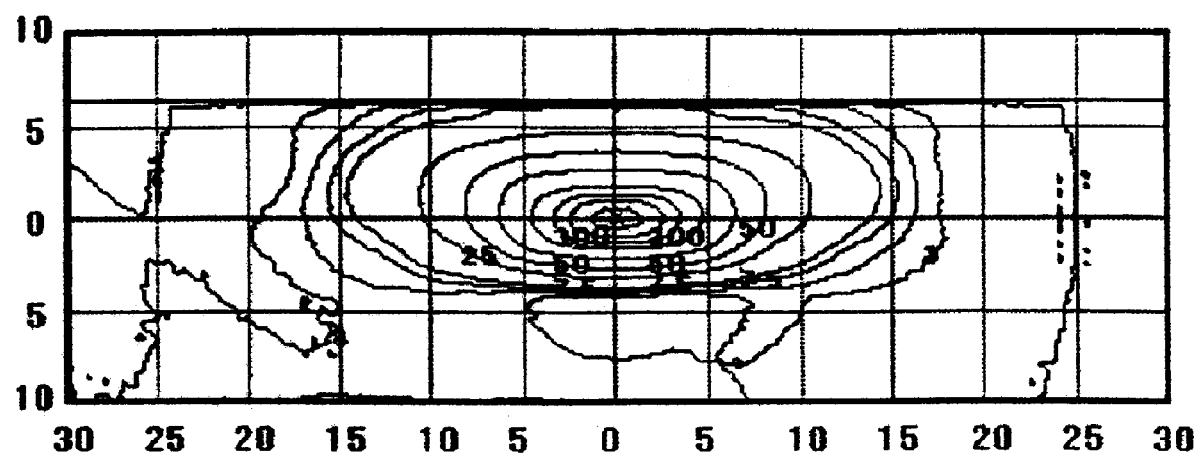
FIG. 10 is a diagram showing a light distribution pattern of a high beam projected by the vehicle headlamp of FIG. 9.
Figure 11:
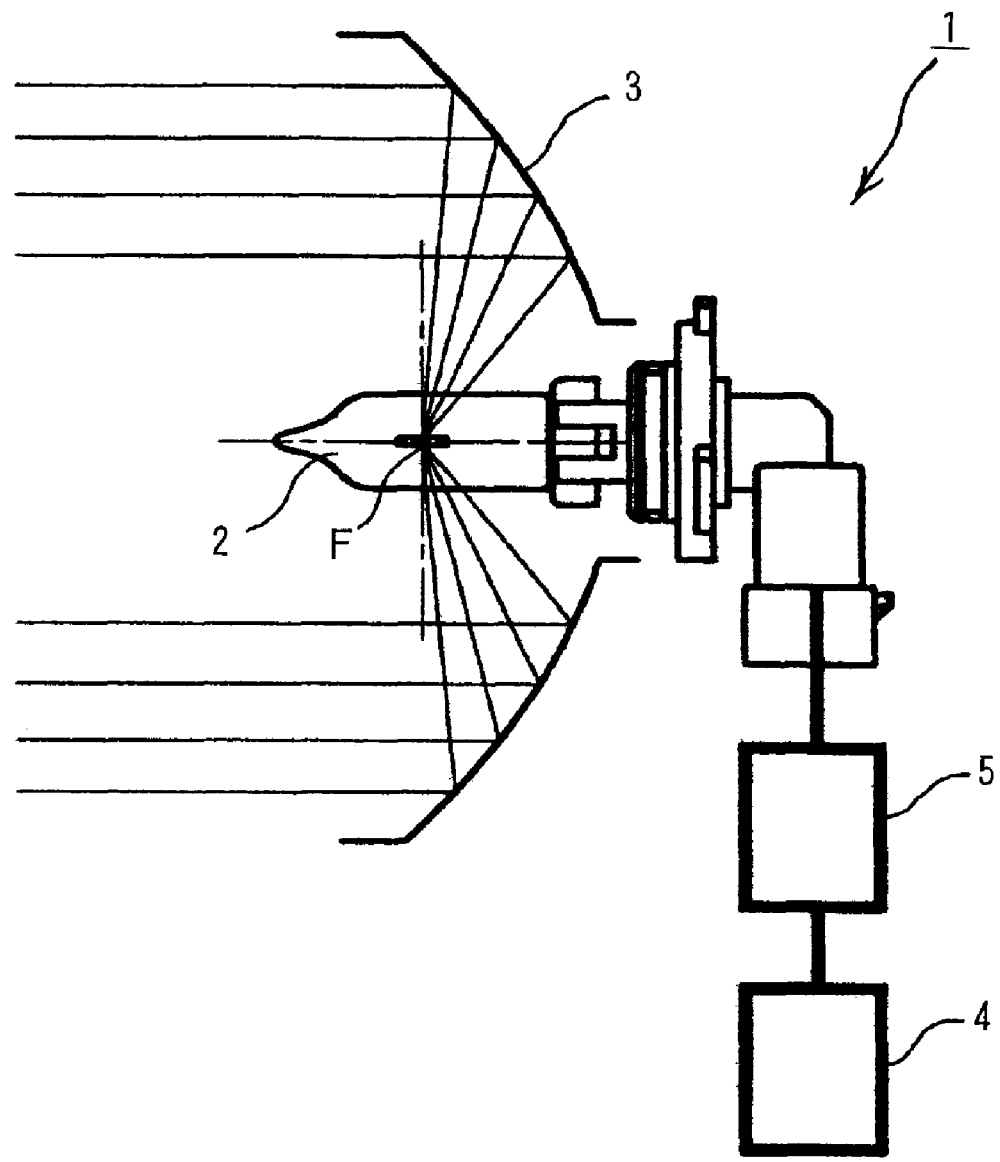
FIG. 11 is a schematic side cross-section showing operation of a daytime running lamp in accordance with the vehicle headlamp of FIG. 9.
Figure 12:
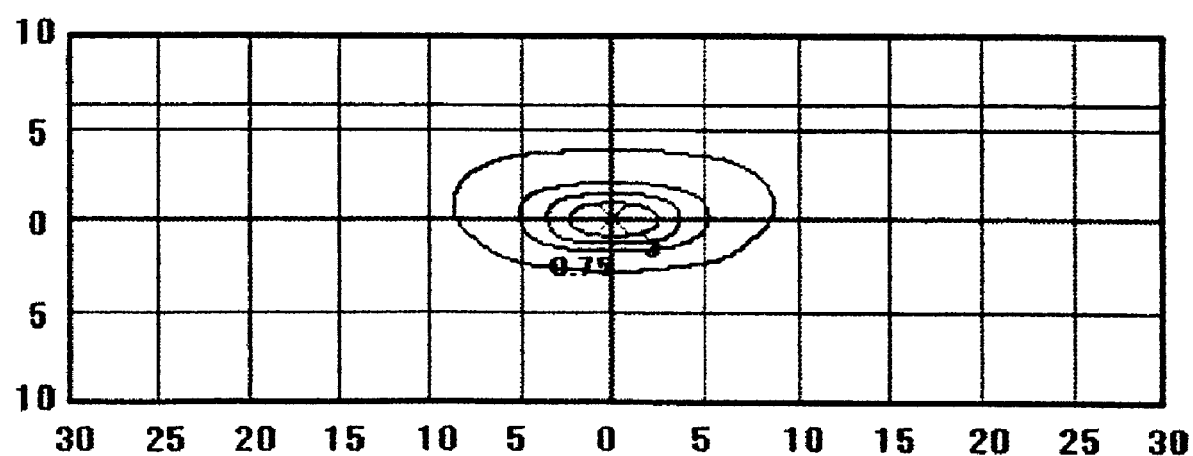
FIG. 12 is a diagram showing a light distribution pattern of the daytime running lamp in accordance with the headlamp of FIG. 9.

FIG. 7 is a graph showing the life of a halogen bulb in accordance with a driving voltage thereof. The lower the driving voltage is, the longer the life of the halogen bulb is. However, when a halogen bulb is used as a light source in a low driving voltage application, a halogen cycle may not be generated due to the low halogen temperature. FIG. 8 shows the life of a halogen bulb in such a low driving voltage application. In this case, the lower the driving voltage, the shorter the life of the halogen bulb is. When the driving voltage of a conventional daytime running lamp is 4.0V, the life of the halogen bulb is about 250 hours. However, when the driving voltage of the daytime running lamp in accordance with the disclosed subject matter is low, e.g. 6.4V, the life of the halogen bulb is approximately 2,200 hours. The reason why the life of the bulb 11 in this case becomes long is because the halogen cycle is generated in the bulb 11.

The above-described embodiment is described with reference to a fog lamp using an H4 bulb, of which the rated power is generally 55 W in the first filament and 60 W in the second filament. A reduction of rated power of the second filament used in the daytime running lamp can result in a longer life of the bulb 11. This is because the higher the driving voltage is, the longer the life of the halogen bulb is in a low driving voltage, as shown in FIG. 8. Finally, the reduction of rated power can result in eliminating the controller 13a. The reason why the controller 13a becomes unnecessary is that the halogen bulb can be driven directly by a battery voltage and still include the halogen cycle thereof. And also, the second filament 11b can be used as a daytime running lamp, a passing light during daytime, and a high beam lamp during nighttime or other conditions by the use of two driving voltages using the controller 13a.

In addition, the vehicle headlamp 10, can be configured to allow various vehicle headlamps, including a daytime running lamp, to be composed by changing a distance between the first filament 11a and the second filament 11b and/or a shape of the reflector 12 including the upper area 12a and the under area 12b.

For instance, a driving lamp, a low beam lamp for a headlight and the like can be composed with the vehicle headlamp 10 using the first filament 11a. When a low beam for a headlight is formed by the vehicle headlamp 10 using the first filament 11a, a structure thereof can be basically the same as that of the above-described fog lamp shown in FIG. 1. A main different point between the fog lamp and a low beam is a position/shape of the boundary line 12c in FIG. 2. When the vehicle headlamp 10 is configured as a low beam lamp using the first filament 11a, the cut-off line should be modified in accordance with each respective regulation of the country in which the vehicle headlamp 10 is used. However, because the vehicle headlamp 10 can be configured to modify the cut-off line, including modification to an elbow line, by changing a position/shape of the boundary line 12c, the vehicle headlamp 10 can compose a low beam for a headlight. In addition, when the above-described controller 13a having two driving voltages is employed, the vehicle headlamp 10 can also include both a low beam and a high beam configuration for a headlight and a daytime running lamp.

When configuring a driving lamp in the vehicle headlamp 10 using the first filament 11a, structures of both the above-described fog lamp and low beam can be used to base the configuration. Because a driving lamp is basically used for compensating between both a low beam and fog lamp, a light distribution thereof can be a distribution pattern that is a cross between that of a fog lamp and a spot lamp as will be described in more detail later. Modification of a shape of the upper area 12a in the reflector 12 allows for the changing of a light distribution pattern such as changing between a broad distribution pattern, a narrow distribution pattern and the like. Thus, the vehicle headlamp 10 can include a driving lamp using the first filament 11a and based on the structure of both the above-described fog lamp and low beam headlight.

Structures of a spot lamp and a high beam lamp including a daytime running lamp will now be given. These structures may be compose based on the structures of FIG. 1, however, the shield member 11c can be removed. The shield member 11c can be removed both a spot lamp and a high beam for a headlight illuminate the road far ahead of the vehicle with high brightness. When the shield member 11c is removed, light emitted from the first filament 11a in a downwards direction can be used via the under area 12b of the reflector 12.

The reflector 12 can form a narrow light distribution pattern using the first filament 11a without the shield member 11c because the first filament is located near the focus of the reflector. Therefore, the vehicle headlamp 10 can compose a favorable light distribution for a spot lamp via the reflector 12 including the upper area 12a and the under area 12b. In the case when the vehicle headlamp 10 gives priority to a narrow light distribution for a spot lamp, a light distribution pattern of a daytime running lamp using the second filament 11b basically becomes narrow according to a narrow light distribution for a spot lamp. However, the vehicle headlamp 10 can also maintain a broad light distribution pattern by extending a distance between the first filament 11a and the second filament 11b.

When the first filament 11a is used as a high beam for a headlight, the vehicle headlamp 10 can have a wider light distribution than that of the above-described spot lamp emitting via the reflector 12 including the upper area 12a and the under area 12b. In this case, a distance between the first filament 11a and the second filament 11b is not required to extend for a daytime running lamp as with the above-described spot lamp. Because the light distribution pattern of a high beam can be wider than that of a spot lamp, the light distribution pattern of a daytime running lamp can also become broad.

As described above, the vehicle headlamp 10 can compose various headlights including a daytime running lamp. In this case, the under area 12b can be configured to form a wider light distribution than that of the upper area 12a. The reflector 12 with under area 12b forming a wider light distribution can illuminate widely in a downwards direction along the light axis so as not to generate a glare. Thus, the vehicle headlamp 10 with the above-described characteristics can result in a high visibility of the driven vehicle as a result of the illumination of a wide area without a glare. In addition, because a halogen bulb can be used as a light source in the vehicle headlamp 10 and can generate a halogen cycle therein, the halogen bulb in the vehicle headlamp 10 can enjoy a long life thereof.

Furthermore, according to the disclosed subject matter, the vehicle headlamp 10 can include a headlight for illuminating the road near the front of the vehicle or a headlight for illuminating the road far ahead and in the distance, respectively, along with the above-described daytime running lamp. That is to say, the vehicle headlamp 10 can also provide various headlights such as a fog lamp, and a low beam for a headlight with a favorable light distribution. Thus, the disclosed subject matter can provide an excellent vehicle headlamp with a simple structure. Various modifications of the above disclosed embodiments can be made without departing from the spirit and scope of the presently disclosed subject matter.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicle headlamp including a daytime running lamp configuration, comprising:
   a parabolic type reflector having a focus and a substantially symmetrical axis, and the parabolic type reflector including an upper portion and an under portion;
   a halogen bulb including a first filament having a rated power of substantially 55 watts, a second filament having a rated power of substantially 60 watts and a shield member and located on the substantially symmetrical axis of the reflector, the first filament located substantially at the focus of the reflector, the second filament located at a position closer to the reflector than the first filament, and the shield member located adjacent the first filament so as to block at least a portion of light emitted from the first filament in a downward direction; and
   a driving circuit electrically connected to both the first filament and the second filament and configured to supply each of the first filament and the second filament with a respective driving voltage for light-emission and configured to supply the second filament having a rated power of substantially 60 watts with voltage that is lower than a battery voltage while generating a halogen cycle in the halogen bulb when the second filament is used as a daytime running lamp, wherein light emitted from the second filament having a rated power of substantially 60 watts is configured for use as the daytime running lamp by using the upper portion and the under portion of the parabolic type reflector, and light emitted from the first filament having a rated power of substantially 55 watts is configured for use as at least one of a fog lamp, a driving lamp and a low beam headlight.

2. The vehicle headlamp including a daytime running lamp configuration according to claim 1, wherein the under portion of the reflector is configured to extend the light emitted from the second filament in both left and right directions towards the symmetrical axis.

3. The vehicle headlamp including a daytime running lamp configuration according to claim 1, wherein light emitted from the first filament is configured for use as a low beam headlight.

4. The vehicle headlamp including a daytime running lamp configuration according to claim 2, wherein light emitted from the first filament is configured for use as a low beam headlight.

5. The vehicle headlamp including a daytime running lamp configuration according to claim 1, wherein the light emitted from the second filament is configured for use as a high beam headlight during nighttime.

6. The vehicle headlamp including a daytime running lamp configuration according to claim 2, wherein the light emitted from the second filament is configured for use as a high beam headlight during nighttime.

7. The vehicle headlamp including a daytime running lamp configuration according to claim 1, wherein the first filament and second filament are located along a light axis of the headlamp, and the shield member is spaced from the light axis and located at a position at which an imaginary line normal to the light axis intersects both the first filament and shield member, and at a position such that a line normal to the light axis and extending from a portion of the second filament closest to the first filament does not intersect the shield member.

8. The vehicle headlamp including a daytime running lamp configuration according to claim 1, wherein the under portion of the reflector is located in the downward direction relative to the upper portion of the reflector, and the shield member is configured to substantially block light emitted from the first filament from being incident upon at least a portion of the under portion of the reflector.

9. The vehicle headlamp including a daytime running lamp configuration according to claim 8, wherein the second filament is located such that light emitted from the second filament is incident upon both the upper portion and under portion of the reflector.

10. The vehicle headlamp including a daytime running lamp configuration according to claim 9, wherein the under portion of the reflector comprises substantially half of a total area of the reflector.

11. A vehicle headlamp including a daytime running lamp configuration, comprising:
- a parabolic type reflector having a focus and a substantially symmetrical axis, and the parabolic type reflector including an upper portion and an under portion;
- a halogen bulb including a first filament having a rated power of substantially 55 watts and a second filament having a rated power of substantially 60 watts and located on the substantially symmetrical axis of the reflector, the first filament located one of substantially at the focus of the reflector and closer to the reflector than the focus of the reflector, the second filament located at a position closer to the reflector than the first filament; and
- a driving circuit electrically connected to both the first filament and the second filament and configured to supply the first filament and the second filament with a respective driving voltage for light-emission and configured to supply the second filament having a rated power of substantially 60 watts with voltage that is lower than a battery voltage while generating a halogen cycle in the halogen bulb when the second filament is used as a daytime running lamp, wherein light emitted from the second filament having a rated power of substantially 60 watts is configured for use as the daytime running lamp by using the upper portion and the under portion of the parabolic type reflector, and light emitted from the first filament having a rated power of substantially 55 watts is configured for use as at least one of a spot lamp and a high beam headlight.

12. The vehicle headlamp including a daytime running lamp configuration according to claim 11, wherein the under portion of the reflector is configured to extend the light emitted from the second filament in both left and right directions towards the symmetrical axis.

13. The vehicle headlamp including a daytime running lamp configuration according to claim 11, wherein light emitted from the first filament is configured for use as a high beam headlight.

14. The vehicle headlamp including a daytime running lamp configuration according to claim 12, wherein light emitted from the first filament is configured for use as a high beam headlight.

* * * * *